United States Patent [19]
Jones

[11] 3,760,191
[45] Sept. 18, 1973

[54] RAMP GENERATOR FOR PRODUCING RAMP CURRENT DURING CONTROLLED RATE DISCHARGE OF STORED CAPACITANCE

[76] Inventor: James J. Jones, 2604 Natalie, Plano, Collin, Tex.

[22] Filed: Aug. 24, 1971

[21] Appl. No.: 174,537

Related U.S. Application Data

[60] Division of Ser. No. 837,855, June 30, 1969, abandoned, Continuation of Ser. No. 229,345, Feb. 25, 1972.

[52] U.S. Cl. .................. 307/228, 307/246, 328/181
[51] Int. Cl. ................................................ H03k 4/08
[58] Field of Search ................... 307/227, 228, 246; 328/181–185

[56] References Cited
UNITED STATES PATENTS

| | | | |
|---|---|---|---|
| 3,031,583 | 4/1962 | Murphy | 307/227 |
| 3,211,924 | 10/1965 | Beck | 307/228 X |
| 3,422,363 | 1/1969 | Foote et al. | 307/227 X |
| 3,579,124 | 5/1971 | O'Hara | 307/227 X |

*Primary Examiner*—Stanley D. Miller, Jr.
*Attorney*—Andrew M. Hassell, Harold Levine, Melvin Sharp and Michael A. Sileo, Jr.

[57] ABSTRACT

A vehicle skid control braking system of the type that includes means for generating a signal varying in accordance with braking conditions, such as vehicle speed, wheel speed and road surface conditions. The system includes a ramp generator responsive to the varying signal means for storing a charge proportional to the varying signal, control means having an output signal varying between first and second values, and discharge means for discharging the storage means at a controlled rate to a level determined by the varying of the control means output signal from the first value to the second value.

4 Claims, 4 Drawing Figures

RAMP GENERATOR FOR PRODUCING RAMP CURRENT DURING CONTROLLED RATE DISCHARGE OF STORED CAPACITANCE

This application is a division of application, Ser. No. 837,855, filed June 30, 1969, now abandoned in favor of Continuation application Ser. No. 229,345, filed Feb. 25, 1972.

This invention relates to a ramp generator and, more particularly, to a ramp generator in the control module of a skid control vehicle braking system.

When braking an automobile under emergency stopping conditions or under adverse road conditions, the possiblity exists that the vehicle will go into an uncontrollable skid or a controllable skid which prevents the driver from bringing his vehicle to a safe stop within the distance available. In either case, one factor that indicates an imminent skid is the deceleration rate of the rear wheels. Some improvement in vehicle stability can be achieved by automatically "pumping" or pulsing the brakes at the rear wheels in an arbitrary pre-programmed way.

Recently, a system has been developed which operates on the principle of inhibiting the normal braking action initiated by the automobile operator. In this system, wheel speed sensors generate signals proportional to wheel speed. The wheel speed signals are processed through a control module which generates a voltage to energize a solenoid in an actuator that controls the hydraulic braking system to the rear wheels. When a skid is imminent, a command signal from the control module causes the actuator solenoid to close a vacuum passage in a diaphragm chamber. By action of the diaphragm and the normal hydraulic pressure from the master cylinder as developed by the automobile operator, the hydraulic pressure to the rear wheels is released, thereby inhibiting the rear wheel braking action. When the rear wheels spin up, the control module produces a signal to de-energize the actuator solenoid. This restores line pressure and reapplies the rear brakes. In effect, the system "pumps" the rear brakes in a manner often recommended for controlled stopping in adverse driving conditions.

The control module includes a frequency converter for each wheel speed sensor to convert a frequency varying signal into a direct current signal. A summation in a summing amplifier of the frequency convertor outputs produces a composite of the wheel speed signals. A deceleration rate detector and an acceleration rate detector respond to the output of the summing amplifier to produce outputs proportional to the rate of deceleration and the rate of acceleration, respectively, of the rear wheels of a motor vehicle. A signal proportional to the output of the summing amplifier is transferred to a ramp generator and one input of a speed inhibit switch. The ramp generator produces a step ramp function having an overall slope related to the actual speed of the automobile when braking to a stop. In addition to a signal related to wheel speed, the speed inhibit switch also has an input from the ramp generator and an input from a retarding force detector. An output is produced at the speed inhibit switch whenever the summation of a wheel speed signal, a ramp signal, and a retarding force signal reaches a threshold condition. The retarding force detector produces an output signal which relates to the braking factors including tire condition, brake condition, and the condition of the road surface. To generate a control signal to the actuator solenoid, the output of the deceleration rate detector, the acceleration rate detector, and the speed switch must have a certain designated relationship. These three signals are the inputs to a brake controller as the last component in the control module.

An object of the present invention is to provide an improved ramp generator. Another object of this invention is to provide an improved ramp generator in a skid control vehicle braking system. A still further object of this invention is to provide apparatus for generating a current signal related to vehicle speed.

In accordance with the present invention, a ramp generator produces an output current that varies inversely with vehicle speed. A voltage proportional to vehicle wheel speed charges an information storage circuit during normal running operation. In a braking mode, the information storage circuit is discharged at a controlled rate so long as normal braking action takes place. When a brake controller inhibits the normal braking operation, the charge in the information storage circuit is held at a fixed level. The controlled discharge begins again from the previous fixed level when the normal braking operation is resumed. The composite discharge of the information storage circuit is along a ramp that varies with vehicle speed.

A more complete understanding of the invention and its advantages will be apparent from the specification and claims and from the accompanying drawings illustrative of the invention.

Referring to the drawings.

Figure 1:
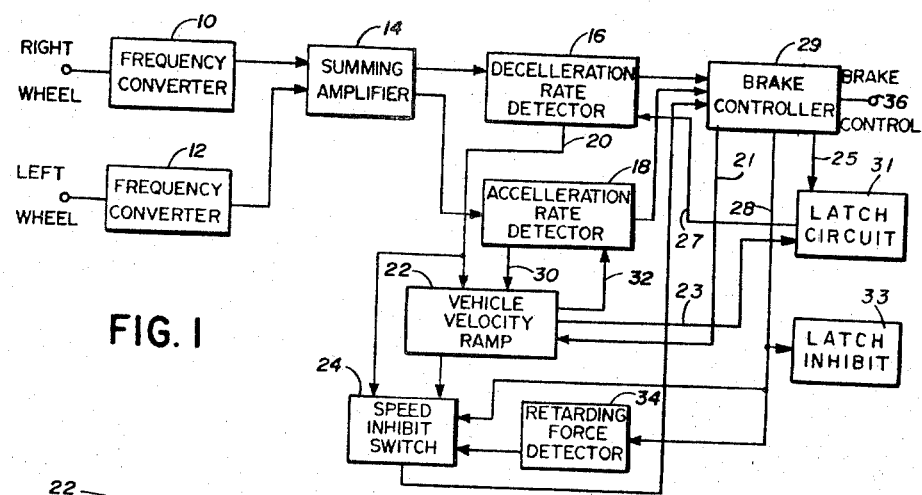
FIG. 1 is a block diagram of a control module for a skid control vehicle braking system.

Referring to the drawings, in FIG. 1 there is illustrated the components of a control module in a skid control vehicle braking system including frequency converters 10 and 12. The frequency convertor 10 connects to a wheel sensor (not shown) at the right rear wheel of a motor vehicle. The wheel sensor generates a signal having frequency variations proportional to wheel speed. The faster the wheel speed, the higher the frequency of the signal connected to the frequency convertor 10. Similarly, the frequency converter 12 responds to a frequency dependent signal from a wheel sensor (not shown) at the left rear wheel of a motor vehicle. The output of the convertors 10 and 12 is a D.C. voltage having a magnitude related to the right rear wheel speed and the left rear wheel speed, respectively.

These two speed dependent voltages are connected to inputs of a summing amplifier 14 which has two output signals both proportional to the sum of the output voltages of the frequency converters 10 and 12. One of the output signals from the summing amplifier 14 connects to a deceleration rate detector 16 and the second output connects to an acceleration rate detector 18. Both the deceleration rate detector 16 and the acceleration rate detector 18 include a driver input section. The output of the driver section of the deceleration rate detector 16 appears on a line 20 and connects to inputs of a ramp generator 22 and a speed inhibit switch 24. Another input to the ramp generator 22 is a signal related to the output of a brake controller 29 on a line 21. A clamping circuit in the acceleration rate detector 18 also connects to the ramp generator 22.

Additional inputs to the speed inhibit switch 24, other than the voltage proportional to wheel speed on line 20, include a ramp current from the ramp generator 22, the signal on the line 28 from the brake controller 29, and a retarding force current from a retarding force detector 34. An output terminal of the speed inhibit switch 24 connects to one input of the brake controller 29. An output signal from the acceleration rate detector 18 is partially controlled by the speed inhibit switch 24. A second input to the controller 29 is the output of the deceleration rate detector 16.

In operation of the control module of FIG. 1, the frequency varying signals generated at the right rear wheel sensor and the left rear wheel sensor are converted in frequency converters 10 and 12, respectively, into D.C. voltages that are combined in a summing amplifier 14 to produce inputs to a deceleration rate detector 16 and an acceleration rate detector 18. The deceleration rate detector 16 generates a signal as one input to the brake controller 29 whenever the deceleration rate of the rear wheels exceeds a set limit. The acceleration rate detector 18 generates a signal as one input to the brake controller 29 whenever the speed inhibit switch 24 does not inhibit the normal operation of the acceleration detector.

To produce a brake inhibit control signal on an output terminal 36, connected to a solenoid (not shown) on a brake actuator, both the detectors 16 and 18 must generate a control signal at the inputs to the brake controller 29. The speed inhibit swtch 24 will release the output of the acceleration rate detector 18 whenever the three input signals thereto satisfy preset conditions, and the switch itself is not inhibited from operating.

In a typical skid control operation, the automobile operator applies pressure to the brake pedal which actuates the hydraulic brake system in the usual manner. When the deceleration rate detector 16 senses that the decrease in rear wheel speed indicates that a skid is imminent, it produces a control signal as one input to the brake controller 29. At the same time, the acceleration rate detector 18 produces a control signal that permits the brake controller 29 to be triggered into a brake inhibit mode if the speed switch 24 has released the output of the detector 18. Whenever a control pulse from the deceleration rate detector 16 is present, and the speed inhibit switch 24 releases the output of the acceleration rate detector 18, an output pulse is generated at the terminal 36 to energize a solenoid at a brake actuator. Energizing this solenoid, as explained previously, interrupts the normal hydraulic pressure applied to the rear wheels thereby inhibiting braking action.

Before the speed inhibit switch 24 will release the output of the acceleration rate detector 18, the sum of an input current related to the rear wheel speed, an input current from the ramp generator 22, and an input current from the retarding force detector 34 must exceed a threshold level.

During the time interval of the brake inhibit signal at the terminal 36, hydraulic pressure is released from the rear wheels which will then begin to spin up to the speed of the vehicle. This spin up of the rear wheels is sensed by the deceleration rate detector 16 and the acceleration rate detector 18 to cause the brake controller 26 to produce an output signal that de-energizes the actuator solenoid, thereby reapplying pressure to the rear wheel brake cylinders. Also provided is a latch circuit 31 which controls the "on time" of the deceleration rate detector 16 by varying its characteristics with respect to vehicle speed and the rate of acceleration of the vehicle wheels. A latch inhibit circuit 33 prevents the latch circuit 31 from controlling the deceleration rate detector until the actuator solenoid is energized. A signal generated by the brake controller 29 and coupled to the latch inhibit circuit 33 via line 28 operates the latch inhibit circuit 33, which in turn releases the latch circuit 31 and allows it to control the "on time" of the deceleration rate detector 16. Latch circuit 31 receives input signals from the vehicle velocity ramp circuit 22 via line 23 and from the brake controller 29 via line 25 and is coupled to control the deceleration rate detector 16 via line 27. On low-mu surfaces at low vehicle speeds, the latch circuit extends the brake inhibit time or "on time" of the deceleration rate detector. Applying hycraulic pressure to the rear wheel cylinders will slow the speed of the rear wheels which will again produce conditions to actuate the brake controller 29, thereby initiating a second inhibit cycle. This operation continues with the rear wheel speed decreasing and increasing until the vehicle has been brought to a controlled stop. In effect, the control module "pumps" the rear brakes in a manner often recommended for controlled vehicle stopping.

Figure 2:
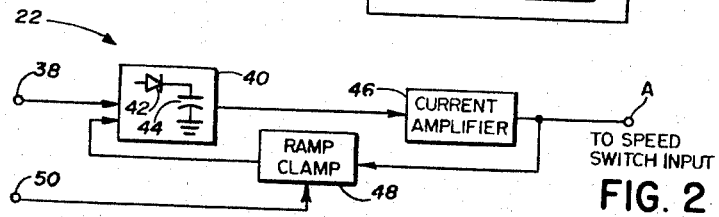
FIG. 2 is a block diagram of a ramp generator for generating a signal related to vehicle speed.
Figure 3:
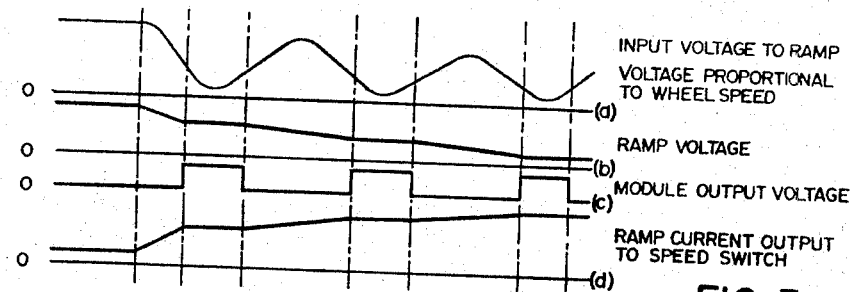
FIG. 3 illustrates the waveforms generated in the operation of a ramp generator in accordance with the present invention.

Referring to FIG. 2, there is shown a block diagram of the ramp generator 22 wherein a signal proportional to wheel speed appears on the input terminal 38 connected to an information storage circuit 40 which consists of a diode 42 and a storage capacitor 44 connected to ground. A charge stored in the circuit 40 provides an input signal to a current amplifier 46. If the wheel speed voltage at the terminal 38 varies in a manner as illustrated at FIG. 3a, then the input to the current amplifier 46 will be a ramp voltage that varies in accordance with the braking speed of a vehicle, as illustrated in FIG. 3b. At the output of the current amplifier 46, there appears a ramp current that varies inversely with vehicle braking speed. The current ramp at the output of the current amplifier 46 is one input to the speed switch 24 for establishing the variable set point speed at which the speed switch operates to release the acceleration rate detector 18 to produce a control pulse for the brake controller 29. In addition to being connected to the speed inhibit switch 24, the output of the current amplifier 46 is fed to a voltage clamping circuit 48 that has a second input in the form of a series of pulses coinciding with the brake inhibit pulses from the controller 29. This second input to the clamping circuit 48 is illustrated in FIG. 3c and is connected to the clamping circuit at an input terminal 50.

In operation, a wheel speed voltage at the terminal 38 charges the capacitor 44 to a level determined by wheel speed. During a braking action, the rear wheel speed decreases but the charge on the capacitor 44 remains at the prebraking level by action of the blocking diode 42. As the rear wheel speed decreases, the capacitor 44 discharges at a controlled rate as determined by the clamping circuit 48. This controlled rate discharge of the capacitor 44 is held at a fixed level, as indicated at FIG. 3b. When the output of the brake controller 29 returns to the normal braking level, the capacitor 44 is again discharged at a controlled rate until another pulse appears. The curve illustrated in FIG. 3b represents the decreasing vehicle speed (not necessarily the wheel speed) during the braking action of a skid control vehicle braking system in accordance with the present invention. As mentioned, the ramp voltage of FIG. 3b is the input to the current amplifier 46 which produces a current ramp related to vehicle braking speed as illustrated in FIG. 3d.

Figure 4:
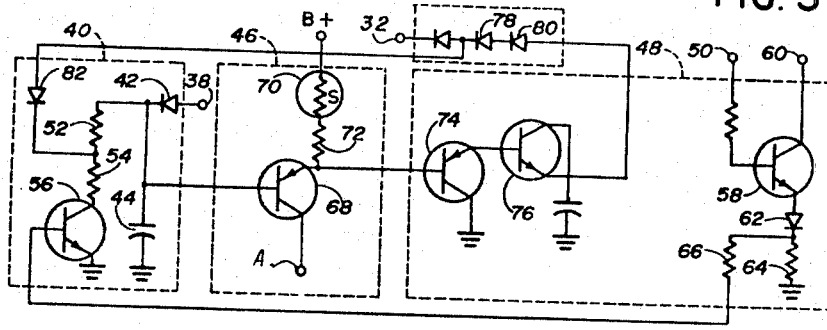
FIG. 4 is an electrical schematic of the ramp generator of FIG. 2.

Referring to FIG. 4, there is shown a schematic of the ramp generator 22 including parts of the acceleration rate detector 18 that provide for a controlled rate discharge of the storage capacitor 44. An input signal at the terminal 38 forward biases the diode 42 to charge the capacitor 44 as explained. Connected to the junction of the diode 42 and the capacitor 44 is part of the controlled rate discharge circuit including series resistors 52 and 54 connected to the collector electrode of a transistor 56. A base drive voltage for the transistor 56 is generated in the clamping circuit 48 at the emitter circuit of a transistor 58. Transistor 58 in turn is controlled between a conducting and nonconducting state by pulse signals coinciding with the brake inhibit pulses on line 28, referring to FIG. 1, at the input terminal 50. Note, only that portion of the clamping circuit 48 as necessary for the operation of the ramp generator 22 is illustrated in FIG. 4. To complete the circuit for the transistor 58, the collector electrode connects to a D.C. voltage source (not shown) at a terminal 60. The emitter circuit for the transistor 58 includes a diode 62 and resistors 64 and 66.

A voltage at the storage capacitor 44 couples to the base electrode of a transistor 68 in the current amplifier 46. The remaining circuitry of the current amplifier 46 includes a sensistor 70 in series with a resistor 72 in the emitter circuit of the transistor 68 and connected to a D.C. voltage source. The output current ramp, that is, one input to the speed inhibit switch 24, appears at the collector electrode of the transistor 68.

Also connected to the emitter electrode of the transistor 68 is the base electrode of a transistor 74 in the circuit 48. The emitter electrode of a transistor 74 is in turn connected to the base electrode of a transistor 76 which has an emitter electrode in series with diodes 78 and 80 in the acceleration rate detector 18 (only a portion of which has been shown). Connected to the cathode of the diode 78 is a diode 82 in the information storage circuit 40.

In operation, a charge is stored on the capacitor 44 by connecting wheel speed voltage to the terminal 38 as explained previously. To control the discharge of the capacitor 44 to produce the ramp function as illustrated in FIG. 3b, the voltage drop across the resistor 52 is equal to two diode drops, approximately 1 volt. This two diode drop across the resistor 52 is maintained by the diode voltage drops in the transistors 68, 74 and 76, and the voltage drops across the diodes 78, 80 and 82. During the controlled rate discharge of the capacitor 44, the transistor 56 is turned on by operating the transistor 58 in a saturated condition when no output signal occurs at the brake controller 29. Thus, the discharge path for the capacitor 44 includes the resistors 52 and 54 and the transistor 56.

When an output pulse appears at the terminal 36 of the brake controller 29, the transistor 58 turns off, which in turn turns off the transistor 56, thereby interrupting the discharge path for the capacitor 44. The charge remaining on the capacitor 44 will then be held at some fixed level since the voltage at the capacitor 44 will be greater than any wheel speed voltage at the terminal 38 and the diode 42 will be back biased. During both the controlled rate discharge of the capacitor 44 and during the holding period, the voltage at the capacitor 44 will drive the transistor 68 to produce a ramp current as one input to the speed inhibit switch 24 which varies inversely with vehicle speed.

Although a preferred embodiment of the invention has been described in detail, it is to be understood that various changes, substitutions, and alterations can be made therein without departing from the spirit and scope of the invention as defined by the appended claims.

What is claimed is:

1. A ramp generator having an input connectable to means for generating a signal varying in accordance with an independent variable comprising: storage means for storing a charge proportional to a magnitude of the signal varying in accordance with the independent variable, said storage means including a diode and a capacitor, said diode having one terminal connected to said input and having another terminal connected to one terminal of said capacitor; charge control means connected to said storage means for discharging said storage means at a controlled rate in response to a control signal, said charge control means including a transistor in a discharge path-defining circuit connected to a junction point common to and connected between said diode and said capacitor; and circuit means connected to said storage means for generating a ramp current proportional to the independently variable signal, said circuit means including a transistor having a base electrode connected to said capacitor and a collector electrode connected to an output terminal.

2. A ramp generator as set forth in claim 1, wherein said charge control means includes a voltage clamping circuit connected to the common junction point between said diode and said capacitor for establishing the controlled rate of discharge of said storage means, and said transistor of said charge control means having a base electrode connected to receive a control signal variable between a first and a second value respectively rendering said transistor conductive and nonconductive for completing or breaking the discharge path-defining circuit.

3. A ramp generator as set forth in claim 2, wherein said voltage clamping circuit includes at least one diode, a resistor, said at least one diode and said resistor being connected in series with the common junction point between said diode and said capacitor of said storage means, and said transistor of said charge control means having a collector electrode connected to a junction point common to and connected between said at least one diode and said resistor.

4. A ramp generator as set forth in claim 3, wherein said circuit means further includes a second transistor having its base-emitter junction connected in a series circuit with the said at least one diode of said voltage clamping circuit.

* * * * *